(12) United States Patent
Huggett

(10) Patent No.: US 8,270,763 B2
(45) Date of Patent: Sep. 18, 2012

(54) SYSTEMS AND METHODS FOR THE EFFICIENT COMPUTATION OF IMAGE TRANSFORMS

(75) Inventor: Anthony Huggett, Hampshire (GB)

(73) Assignee: Aptina Imaging Corporation, George Town, Grand Cayman (KY)

( * ) Notice: Subject to any disclaimer, the term of this patent is extended or adjusted under 35 U.S.C. 154(b) by 610 days.

(21) Appl. No.: 12/489,175

(22) Filed: Jun. 22, 2009

(65) Prior Publication Data

US 2010/0303383 A1    Dec. 2, 2010

(30) Foreign Application Priority Data

Jun. 2, 2009    (GB) .................................. 0909478.0

(51) Int. Cl.
*G06K 9/36*    (2006.01)
(52) U.S. Cl. ....................... 382/282; 382/300
(58) Field of Classification Search .................. 382/100, 382/274, 276, 282, 289, 293, 295, 300
See application file for complete search history.

(56) References Cited

U.S. PATENT DOCUMENTS

| 5,448,301 | A | * | 9/1995 | Michener | 348/578 |
| 6,028,969 | A | * | 2/2000 | Gielow | 382/300 |
| 6,219,149 | B1 | * | 4/2001 | Kawata et al. | 358/1.15 |
| 6,535,221 | B1 | | 3/2003 | Allen et al. | |
| 8,000,563 | B2 | * | 8/2011 | Yoshino et al. | 382/300 |
| 2010/0014770 | A1 | | 1/2010 | Huggett et al. | |
| 2010/0289835 | A1 | * | 11/2010 | Holub | 345/690 |

FOREIGN PATENT DOCUMENTS

| EP | 0 264 964 | 4/1988 |
| GB | 2 289 818 | 11/1995 |

* cited by examiner

*Primary Examiner* — Stephen R Koziol
(74) *Attorney, Agent, or Firm* — Kramer Levin Naftalis & Frankel LLP

(57) ABSTRACT

Image transforms that can be performed through a reverse lookup process in which output pixel addresses of an output image are reverse transformed into input pixel addresses. In some embodiments, rather than reverse transforming all output pixel addresses, a subset of output pixel addresses can be reverse transformed to calculate transformed addresses. The reverse transforms of all output pixel address may then be approximately calculated by interpolating the transformed addresses. The approximately transformed addresses can then be used as read addresses to a memory storing the input image.

21 Claims, 9 Drawing Sheets

Output Grid
400

Input Image
420

4x4 Interpolation
Approximation
440

Output Grid
500

Input Image
520

2x2 Interpolation
Approximation
540

FIG. 6

SYSTEMS AND METHODS FOR THE EFFICIENT COMPUTATION OF IMAGE TRANSFORMS

CROSS-REFERENCE TO RELATED APPLICATION

This application claims priority under 35 U.S.C. 119(a)-(d) to GB Patent Application No. 0909478.0, filed on Jun. 2, 2009, which is fully incorporated herein by reference.

FIELD OF THE INVENTION

The present invention relates to systems and methods for the efficient computation of image transforms. In particular, the present relates to performing image transforms through interpolating approximately transformed output pixel addresses via a subset of accurately transformed output pixel addresses.

BACKGROUND OF THE INVENTION

An image transform can generally include any suitable transform that creates an output image from an input image. The output image can be created from the entirety of the input image or from any portion of the input image. For example, the output image and the input image can each consist of a set of pixels. The pixels can include information related to their position (e.g., where they are located in the image) and to their data (e.g., the color value of the pixel, the intensity value of the pixel, or both). When performing an image transform on the input image, the pixels of the output image can be calculated from any portion of the pixels of the input image.

Image transforms can include, for example, dewarping, rotations, perspective adjustments, or any other suitable image transform. In a dewarping image transform, a rectilinear version of the input image can be created. For example, an input image can be created from a fisheye lens, thus resulting in a warped input image in which straight lines can appear curved. Performing a dewarping image transform on the input image may then create a rectilinear output image in which the lines that appeared curved now appear straight. As another example, a rotation image transform can create an output image that changes the direction in which the camera appears to be facing in the input image. As yet another example, a perspective adjustment image transform can create an output image which makes it seem that the camera that took the input image was positioned in a different location than it actually was.

BRIEF DESCRIPTION OF THE FIGURES

FIG. 6 shows an illustrative output pixel grid in accordance with some embodiments of the invention.

DETAILED DESCRIPTION OF THE INVENTION

An image transform can generally include any suitable process that creates an output image from an input image. The output image and the input image can be composed from a set of pixels, where the attributes of each pixel can be determined by its particular pixel information. The pixel information can include, for example, the pixel address (e.g., the location or x-y coordinates of the pixel within the image) and the pixel data (e.g., color value, intensity value, or both).

In some embodiments, an image transform can be accomplished through a reverse lookup process. In a reverse lookup process, the process can begin with the output pixel addresses of the output image. Each output pixel address can then be "reverse transformed" to determine a particular input pixel address of the input image. The input pixel address that is calculated by the reverse transform can depend on the image transform that is being performed (e.g., dewarping, rotation, perspective adjustment, pan, tilt, zoom, or any other suitable image transform). The input pixel data associated with that particular input pixel address can then be read from the input image and used as output pixel data (e.g., can be used as output pixel data for the output pixel address that was reverse transformed).

In some embodiments, rather than reverse transforming an output pixel address into an integer input pixel address, the output pixel address may be reverse transformed into a fractional input pixel address. For example, the address for a particular output pixel may reverse transform into an input pixel address that is located in-between two or more neighboring input pixels. In this case, the appropriate output pixel data to associate with that output pixel address can be calculated by interpolating this information from the neighboring input pixels. Interpolating output pixel data from neighboring input pixels can help create a better quality output image that, for example, may have features with smoother edges.

Figure 1:
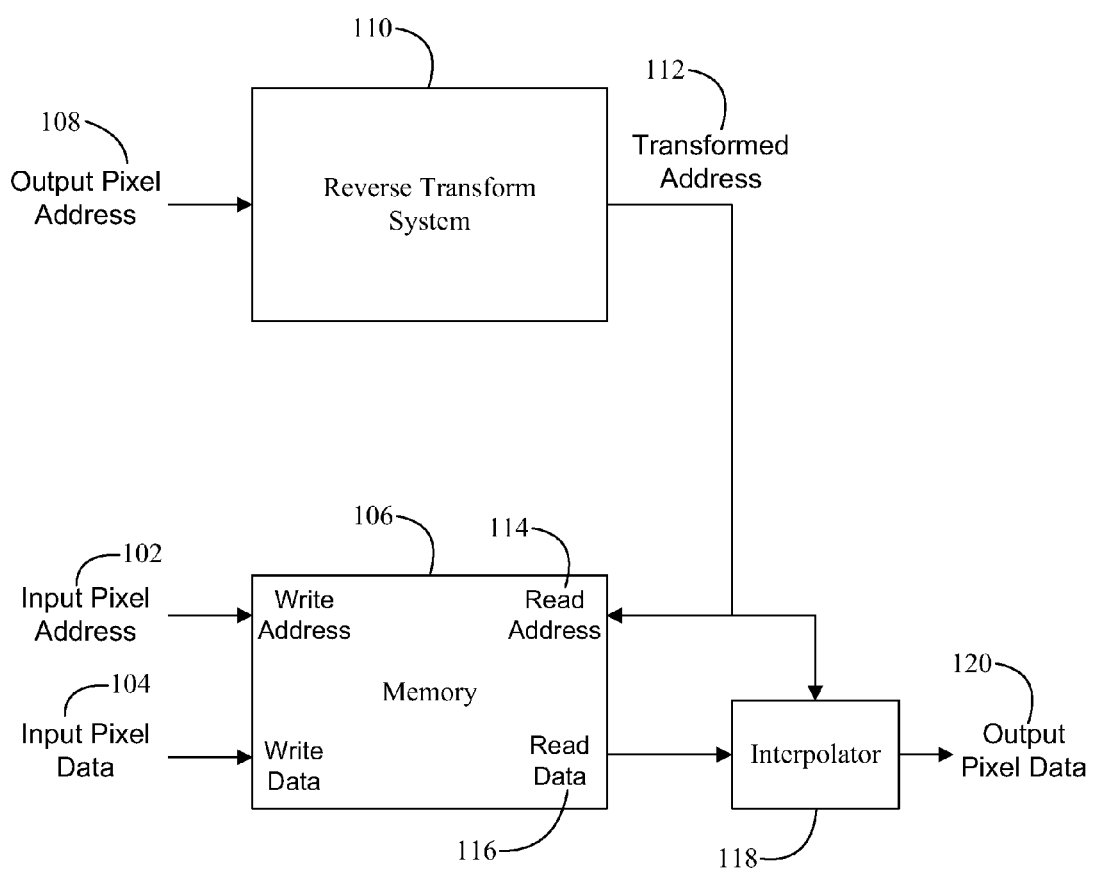
FIG. 1 shows an illustrative reverse lookup process for performing an image transform in accordance with some embodiments of the invention.

FIG. 1 shows a schematic view of image transform system 100 that can use a reverse lookup process. Input pixel information, such as Input Pixel Address 102 and Input Pixel Data 104, can be written to Memory 106. Memory 106 can include any suitable data storage medium such as, for example, a hard-drive, solid state drive, flash memory, permanent memory such as ROM, cache memory, semi-permanent memory such as RAM, or any other suitable type of storage component, or any combination of the above.

Output Pixel Address 108 can serve as an input to Reverse Transform System 110. Reverse Transform System 110 can perform any suitable reverse transform on Output Pixel Address 108 to create Transformed Address 112. Reverse Transform System 110 can be, for example, implemented in hardware or dedicated circuitry for performing the reverse transform, implemented in software, or implemented in a hybrid combination of the above.

Transformed Address 112 can be used as an input to Read Address 114 of Memory 106. In response to inputting Transformed Address 112 into Read Address 114, the input pixel data that is located at Transformed Address 112 can be output from Read Data 116 of Memory 106. As mentioned above, in some embodiments, Transformed Address 112 can correspond to a fractional pixel address. Accordingly, in this case, the data that is output from Read Data 116 of Memory 106 can correspond to the input pixel data of the input pixels neighboring the pixel at Transformed Address 112. Interpolator 118 can perform any suitable interpolation calculations on the input pixel data of these neighboring pixels in order to calculate Output Pixel Data 120.

One skilled in the art can appreciate that one or more of the components of image transform system 100 can be combined or omitted. Furthermore, image transform system 100 can include other components not combined or included in those shown in FIG. 1, or several instances of the components shown in FIG. 1. For the sake of simplicity, only one of each of the components is shown in FIG. 1.

Figure 2:
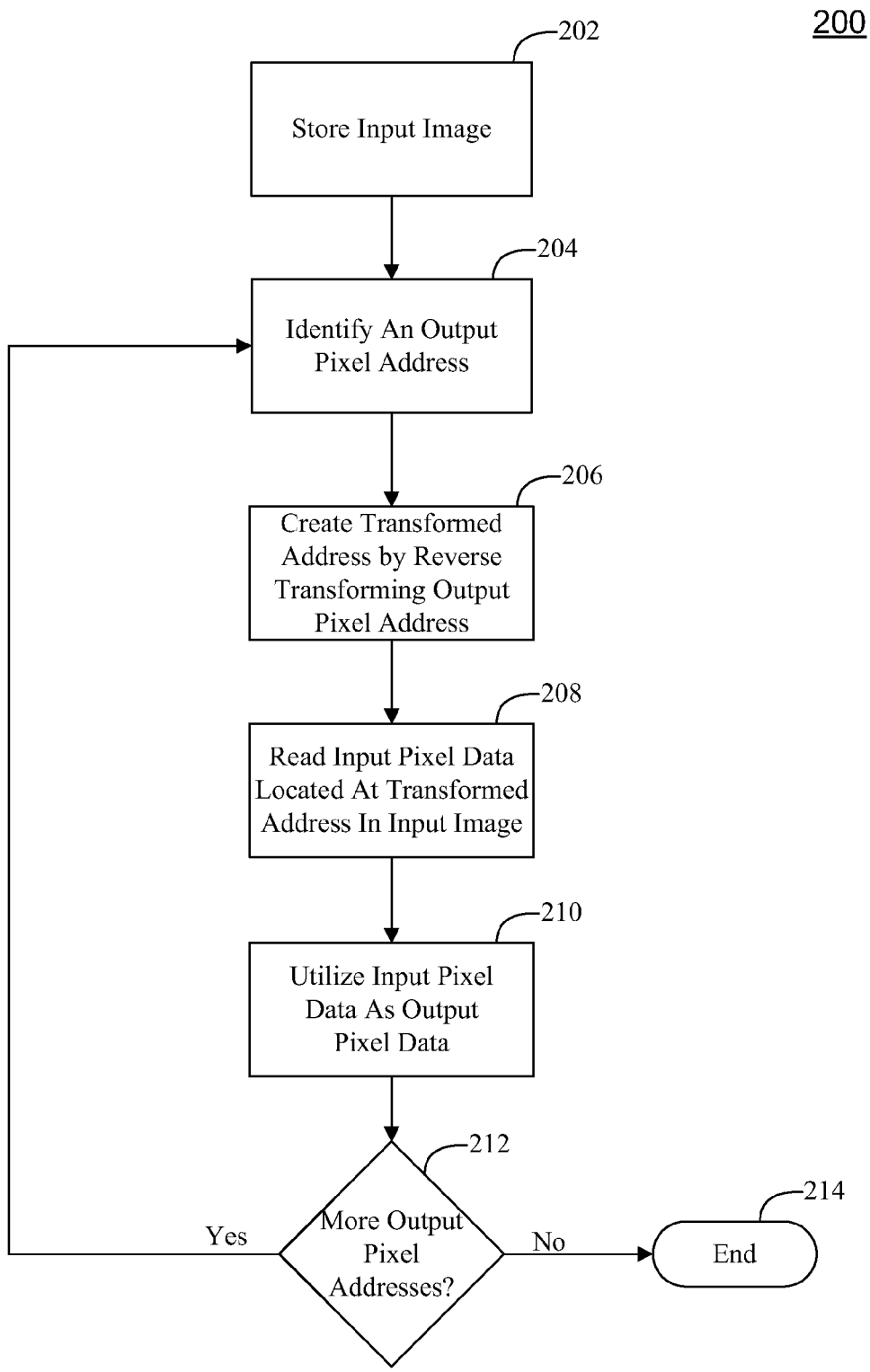
FIG. 2 shows an illustrative process for performing an image transform in accordance with some embodiments of the invention.

FIG. 2 shows process 200 that can use a reverse lookup process to perform an image transform. At step 202, process 200 can store the input image. For example, the pixel information (e.g., the pixel addresses and pixel data) can be stored in a memory such as Memory 106 of FIG. 1.

At step 204, an output pixel address to be reverse transformed can be identified. For example, in some embodiments, every output pixel address of the output image can be incrementally reverse transformed. In this case, a counter can be used to increment the output pixel addresses. Thus, the output pixel address that is currently identified by the counter can be identified at step 204.

At step 206, a transformed address can be calculated by reverse transforming the output pixel address identified at step 204. For example, a system such as Reverse Transform System 110 of FIG. 1 can be used to calculate the transformed address (e.g., Transformed Address 112 of FIG. 1).

At step 208, the input pixel data of the input image associated with the transformed address can be read. For example, the transformed address can be used as the Read Address input to the device that stores the input image at step 202 (e.g., Read Address input 114 and Memory 106 of FIG. 1).

At step 210, the input pixel data that was read at step 208 can be used as the output pixel data of the output image. For example, the input pixel data that was read at step 208 can be associated with the output pixel address identified at step 204 in order to define a pixel of the output image. In some embodiments, when the transformed address is a fractional address, the output pixel data can be calculated by interpolating the input pixel data of the input pixels neighboring the fractional address.

At step 212, process 200 can determine whether there are more output pixel addresses to be reverse transformed. If there are more output pixel addresses to be reverse transformed, process 200 can return to step 204. Process 200 can then continue to repeat steps 204, 206, 208, 210, and 212 until all suitable output pixel addresses of the output image have been reverse transformed. In response to all suitable output pixels addresses being reverse transformed, process 200 can end at step 214.

The complexity of and the calculations required to perform a reverse transform (e.g., such as a reverse transform performed by Reverse Transform System 110 of FIG. 1) can depend upon the type of image transform that is performed (e.g., dewarping, rotation, perspective adjustment, pan, tilt, zoom, or any other suitable image transform). Generally, however, the reverse transform calculations can be relatively complex and large in size in comparison to other types of general calculations. For example, if a dedicated circuit is used to perform the reverse transform calculations, this dedicated circuit may require a substantial amount of microchip space due to the complexity of its circuitry. As another example, if software is used to perform the reverse transform, a substantial amount of computing power may be required for performing this reverse transform.

Accordingly, in some embodiments, a more efficient image transform can be performed by reverse transforming a subset of the output pixel addresses (e.g., as opposed to reverse transforming all of the output pixel addresses). The reverse transformed subset of output pixel addresses can be interpolated in order to "approximately" reverse transform the output pixel addresses. As used herein, the term "approximately transformed address" refers to an estimation of the reverse transform of an output pixel address, where the estimation can be calculated by, for example, interpolation. Furthermore, as used herein, the term "accurately transformed address" refers to an output pixel address that has been reverse transformed (e.g., reverse transformed by a system such as Reverse Transform System 110 of FIG. 1).

Approximately transformed addresses can require fewer calculations and be less complex to determine than accurately transformed addresses. For example, the hardware necessary to perform a reverse transform can require circuitry that calculates multiple sine or cosine calculations per pixel. The hardware necessary to perform an interpolation, on the other hand, can require smaller and less complex circuitry. For example, the hardware for a bilinear interpolation calculation can include smaller and less complex circuitry such as a few multipliers, a few adders, or both. Accordingly, using an interpolator to approximately reverse transform the output pixel addresses, rather than reverse transforming the entire set of output pixels, can provide for a more efficient image transform. For example, using an interpolator can allow for an image transform system that may require less circuitry and thus may use less power and require less microchip space. Additionally, using an interpolator can allow for computational savings (e.g., in hardware, software, or both) due to the decreased complexity of the required calculations.

Figure 3:
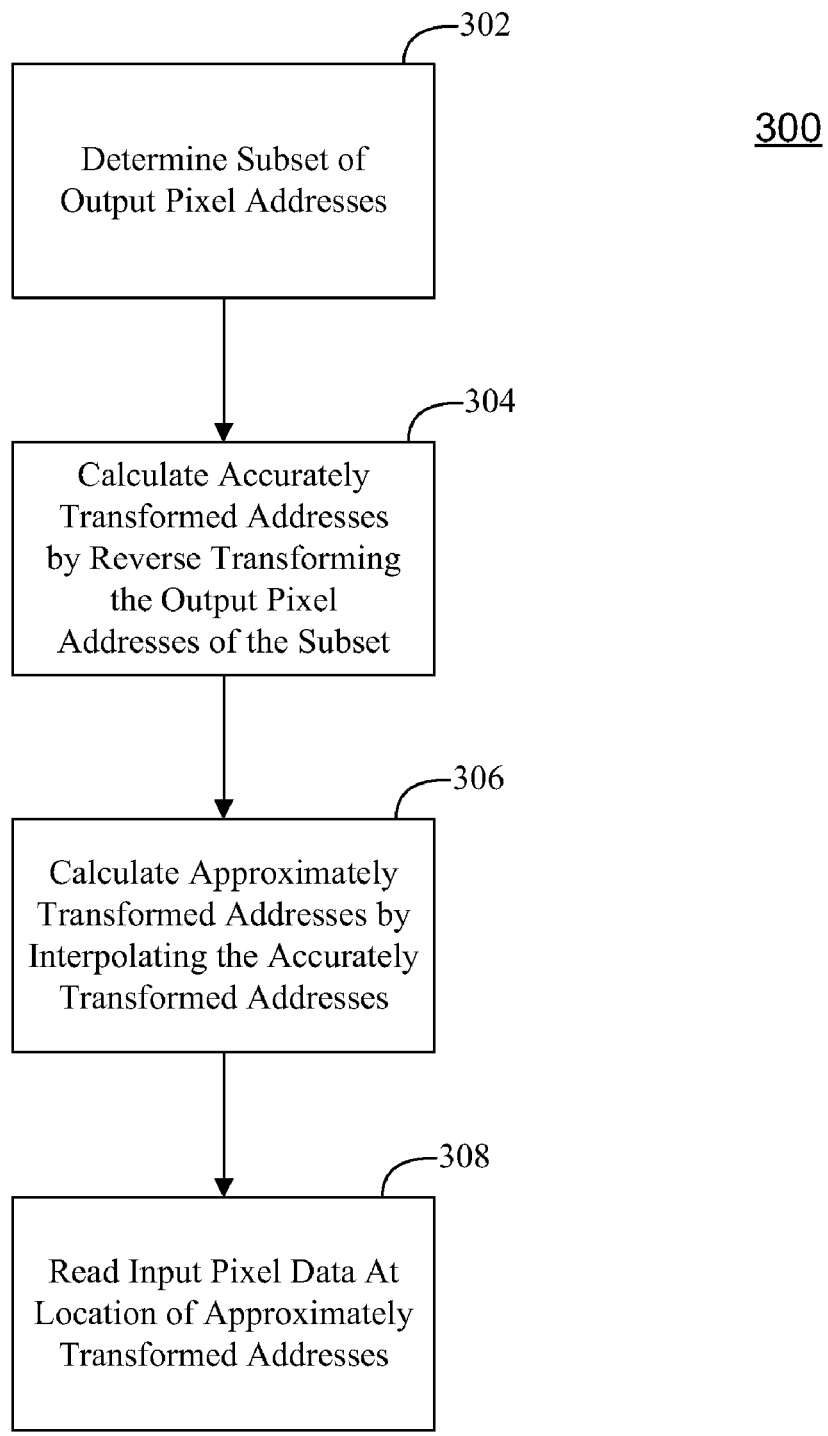
FIG. 3 shows an illustrative process for performing an image transform in accordance with some embodiments of the invention.

FIG. 3 shows process 300 that can perform an efficient image transform. At step 302, a subset of output pixel addresses can be determined. In some embodiments, the subset of output pixel addresses can be chosen to be the vertices of an "output pixel grid." For example, the output image can be divided into an output pixel grid, where each grid space of the output pixel grid encloses a particular set of pixels. The addresses of the pixels located at the vertices of each grid space can then be used as the subset of output pixel addresses. Output pixel grids and their relationship to an image transform will be discussed in more detail in the description to follow and in relationship to FIGS. 4A-4C and 5A-5C. One skilled in the art can appreciate, however, that the subset of output pixel addresses are not limited to the vertices of a grid. Rather, in some embodiments, the subset can include any suitable set of output pixel addresses.

At step 304, the subset of output pixel addresses can be reverse transformed, thus creating a set of accurately transformed addresses. As used herein, the term "accurately transformed address" refers to an output pixel address that has been reverse transformed (e.g., reverse transformed by a system such as Reverse Transform System 110 of FIG. 1).

At step 306, the approximately transformed addresses of the output pixels can be calculated by interpolating the accurately transformed addresses. As used herein, the term "approximately transformed address" refers to an estimation of the reverse transform of an output pixel address, where the estimation can be calculated by, for example, interpolation. In some embodiments, an interpolation process such as bilinear interpolation, bicubic interpolation, or any other suitable type of interpolation or estimation can be used to estimate the reverse transform of the output pixel address. Throughout this paper, for the sake of simplicity, bilinear interpolation will be assumed when an interpolation process is discussed. However, one skilled in the art could appreciate that any other suitable interpolation or estimation process could be used without departing from the scope of the invention.

At step 308, the input pixel data associated with the approximately transformed addresses can be read from the input image. Similar to the processes mentioned above, in some embodiments the approximately transformed address can include a fractional address. In this case, the appropriate input pixel data can be interpolated from the pixels neighboring the fractional address. The interpolated input pixel data can then be associated with the appropriate output pixel address and used as the output pixel data of the output image.

Figure 4A:
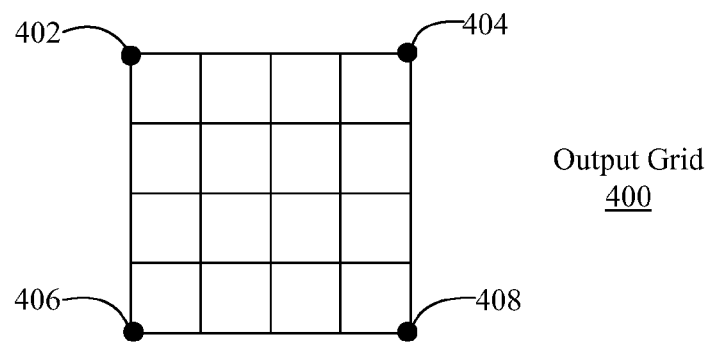
FIGS. 4A-4C and 5A-5C show illustrative output pixel grids in accordance with some embodiments of the invention.

FIGS. 4A-4C and 5A-5C illustrate various output pixel grids and their relationship to an image transform. FIG. 4A shows output pixel grid 400. Output pixel grid 400 can include twenty-five pixel locations (e.g., addresses) of the output image, where a pixel is located at a vertex of each grid space. In output pixel grid 400, a subset of four pixels, pixel 402, pixel 404, pixel 406, and pixel 408, have been chosen from the twenty-five pixels of output pixel grid 400. The locations of the pixels of this subset can be accurately transformed through a reverse transformation.

Figure 4B:
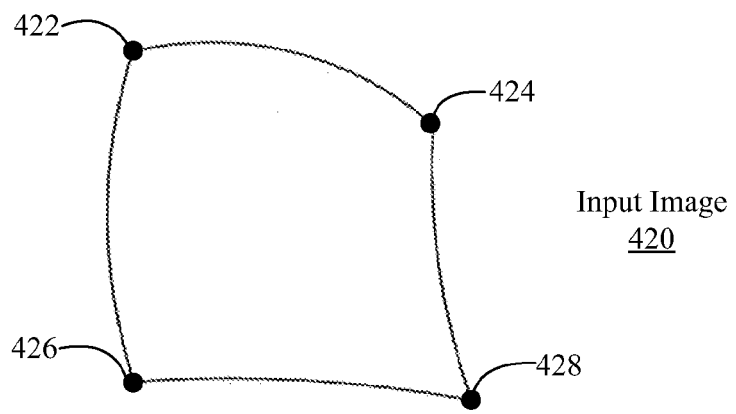

FIG. 4B shows input image 420. Each of the locations of pixels 402, 404, 406, and 408 of output grid 400 can be accurately reverse transformed into a pixel location (e.g., address) of input image 420. For example, the location of pixel 402 can be reverse transformed into the location of input pixel 422, the location of pixel 404 can be reverse transformed into the location of input pixel 424, the location of pixel 406 can be reverse transformed into the location of input pixel 426, and the location of pixel 408 can be reverse transformed into the location of input pixel 428.

Figure 4C:
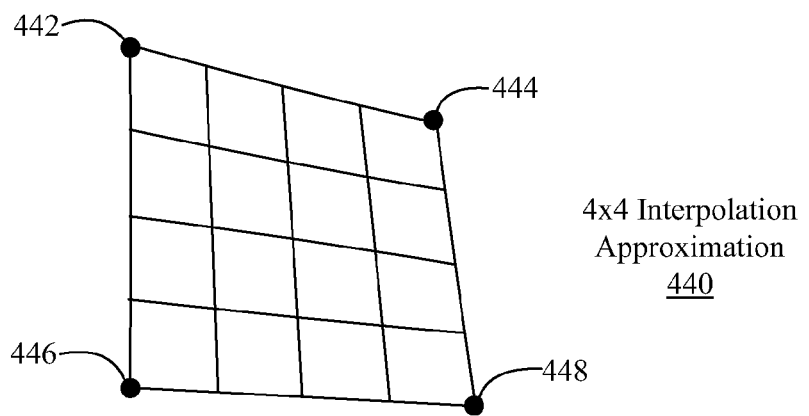

In order to approximately reverse transform the locations of the remaining output pixels of output grid 400, the accurately transformed pixel locations (e.g., the locations of input pixels 422, 424, 426, and 428) can be interpolated. For example, FIG. 4C shows 4×4 interpolation approximation 440. In FIG. 4C, the accurately transformed pixels locations (e.g., the locations of pixels 442, 444, 446, and 448) are located at an address that accurately calculates the input image. The locations of pixels 442, 444, 446, and 448 can then be interpolated to estimate the remaining pixel locations of the input image. For example, bilinear interpolation can be used. Since the pixels to be accurately transformed in FIG. 4A create patches that enclose a section of 4×4 grid spaces, FIGS. 4A-C can represent a 4×4 interpolation approximation (i.e., an interpolation with 4×4 input patches). As can be seen by comparing FIGS. 4B and 4C, although 4×4 interpolation approximation 440 can estimate input image 420, it may not exactly calculate input image 420.

Figure 5A:
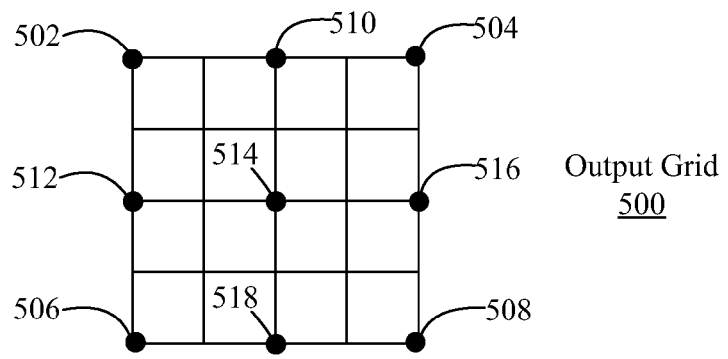
Figure 5B:
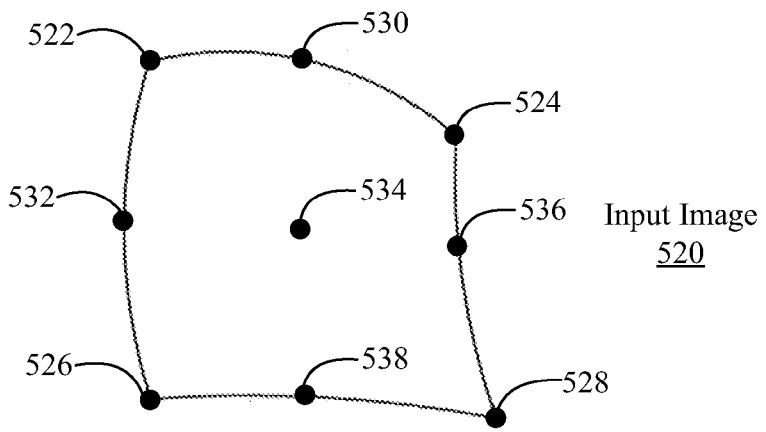
Figure 5C:
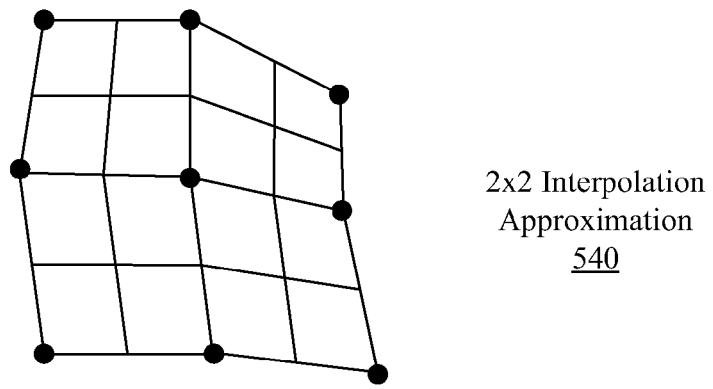

FIGS. 5A-C illustrate an example of a 2×2 interpolation estimation (i.e., an interpolation with 2×2 input patches). FIG. 5A shows output grid 500 in which a subset of nine pixels have been chosen to be accurately transformed through a reverse transformation (e.g., pixels 502, 504, 506, 508, 510, 512, 514, 516, and 518). As can be seen from FIG. 5A, the pixels which will be accurately transformed create patches that enclose sections of 2×2 grid spaces.

FIG. 5B shows input image 520. Each of the locations of pixels 502, 504, 506, 508, 510, 512, 514, 516, and 518 of output grid 500 can be accurately transformed into pixel locations (e.g., addresses) of input image 520. For example, the locations of input pixels 522, 524, 526, 528, 530, 532, 534, 536, and 538 can be accurately calculated by reverse transforming, respectively, the locations of pixels 502, 504, 506, 508, 510, 512, 514, 516, and 518 of output grid 500. FIG. 5C shows 2×2 interpolation approximation 540 that can be calculated by interpolating between these nine, accurately transformed pixel locations.

Similar to what was shown in FIG. 4C, although 2×2 interpolation approximation 540 can estimate input image 520, it may not exactly calculate input image 520. However, when comparing FIG. 4C to FIG. 5C, 2×2 interpolation approximation 540 more accurately estimates the locations of the pixels in the input image than 4×4 interpolation approximation 440.

Generally, the smaller the size of the grid spaces, the more accurately an interpolation may estimate the locations of the pixels in the input image (e.g., where a 2×2 grid space is smaller in size than a 4×4 grid space). For example, a larger grid space (e.g., 128×128) may result in a transformed image in which straight lines inaccurately appear rippled. These ripples can occur in the larger grid space since there may be interpolated pixel locations that are relatively far from accurately transformed pixel locations, and this distance may result in inaccuracies in the interpolated pixel locations. These inaccuracies may visually manifest by, for example, causing straight lines to appear noticeably rippled. As another example, a smaller grid space (e.g., 64×64) may have smaller and/or fewer inaccuracies and thus may result in a transformed image in which straight lines have a ripple that is only slightly visible. As yet another example, an even smaller grid space (e.g., 32×32) may have even smaller and/or even fewer inaccuracies and thus may result in a transformed image in which this ripple is invisible to the human eye. Accordingly, a smaller grid space may result in a more accurate image transform of the input image.

However, a smaller grid space can require more output pixel locations to be accurately reverse transformed than a larger interpolation patch. Accordingly, a system utilizing a smaller grid space may be more computationally complex than a system utilizing a larger grid space. Thus, although a system which reverse transforms a subset of the output pixel locations may have computational savings over a system which reverse transforms all output pixel locations, as the grid space becomes smaller in size, the computational savings may also become smaller. For example, a system with a smaller grid space (e.g., 2×2) may have 75% computational savings over a system that reverse transforms all output pixels locations. As another example, a system with a larger grid space (e.g., 4×4) may have 96.25% computational savings over a system that reverse transforms all output pixels locations. As yet another example, a system with an even larger grid space (e.g., 32×32) may have 99.9% computational savings.

Accordingly, a larger grid space can result in greater computational savings but may decrease the quality of the transformed image. Conversely, a smaller grid space may provide less computation savings but result in a higher-quality transformed image. Therefore, in some embodiments, a grid space size can be chosen that attempts to balance the benefits of the computational savings versus the reduced quality of the transformed image.

Figure 6:
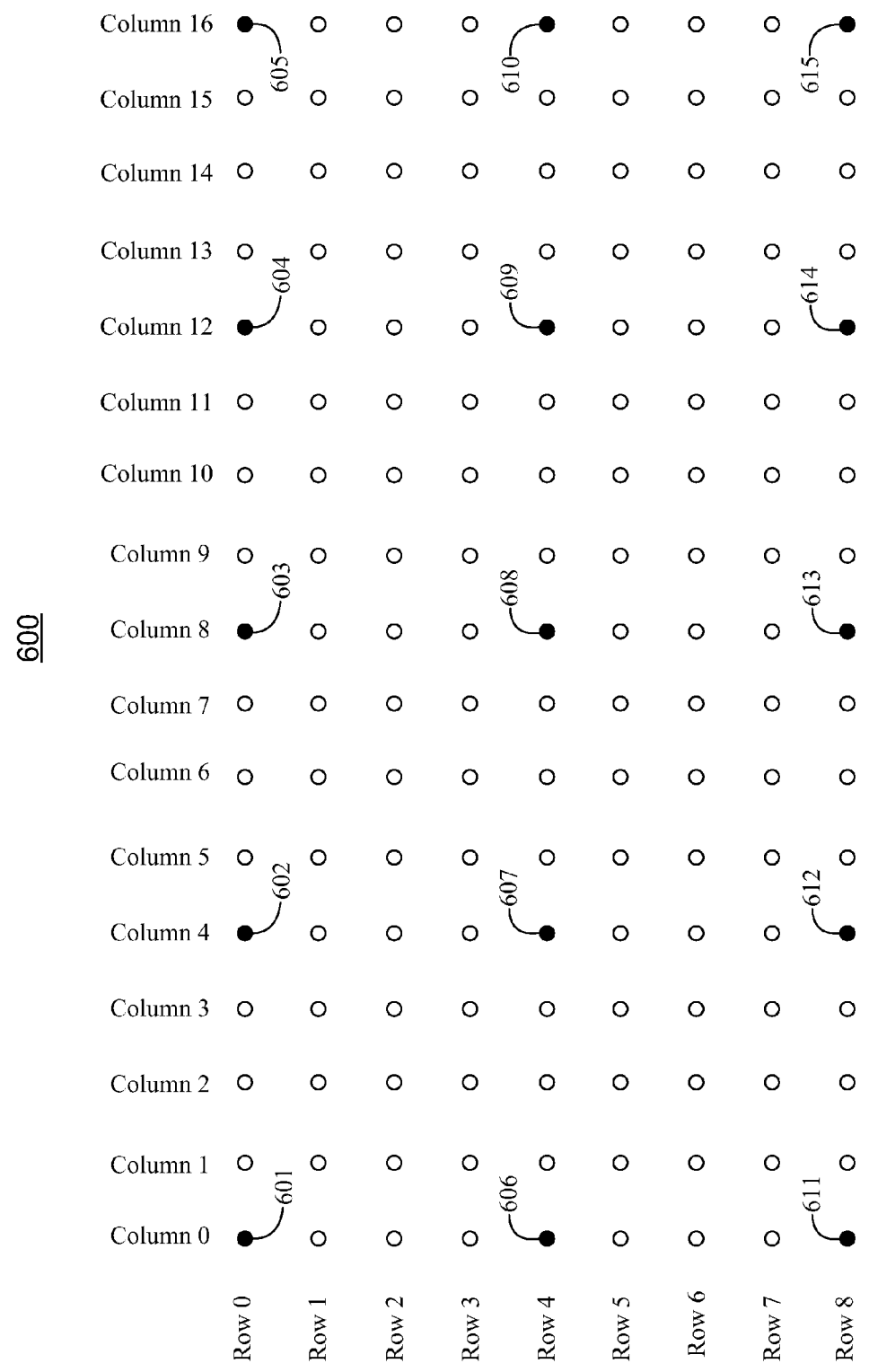

FIG. 6 shows illustrative output grid 600 that includes sixteen columns and eight rows of pixels with a 4×4 grid space. For example, pixel locations 601-615 of output grid 600 can be accurately reverse transformed. The reverse transforms of the pixel locations in output grid 600 can then be approximately transformed by interpolating these accurately transformed pixel locations.

In order for a particular output pixel location to be interpolated, the accurately transformed addresses necessary for that interpolation calculation should be already calculated and stored in memory. For example, the pixel addresses of Row 0 can be interpolated (e.g., approximately transformed) from the accurately transformed pixel addresses of Row 0 (e.g., the accurately transformed pixel addresses of pixels 601-605). Accordingly, before the interpolation of Row 0 begins, the reverse transforms of the addresses of pixels 601-605 can be calculated and stored in memory. Similarly, before the interpolation of Row 4 begins, the reverse transforms of the addresses of pixels 606-610 can be calculated and stored in memory. And before the interpolation of Row 8 begins, the reverse transforms of the addresses of pixels 611-615 can be calculated and stored in memory. As another example, Rows 1-3 can be interpolated from the accurately transformed pixel addresses of Row 0 and Row 4 (e.g., the accurately transformed pixel addresses of pixels 601-605 and 606-610, respectively). Accordingly, the accurately transformed pixels of Row 0 and Row 4 should be calculated and stored in memory before Rows 1-3 are interpolated. Similarly, the accurately transformed pixels of Row 4 and Row 8 should be calculated and stored in memory before Rows 5-7 are interpolated.

In some embodiments, the speed of the reverse transformation can be designed slow enough such that the reverse transformation calculations are not finished until approximately when these reverse transformed values are required. For example, in FIG. 6, the reverse transform computation can be designed such that pixels 611-615 of Row 8 are accurately transformed in approximately the time it takes for Rows 1-4 to interpolate (e.g., 4 row periods of time). As used herein, the term "row period of time" refers to the time required to interpolate the approximately transformed addresses for one row of output pixel addresses. In this manner, the reverse transformation calculations of Row 8 may not complete until their calculations are required (e.g., until they are required for interpolating Rows 5-7). Designing a system that is not faster than necessary may reduce the complexity of and the computational power required by the system, thus creating a more efficient image transform system.

Figure 7:
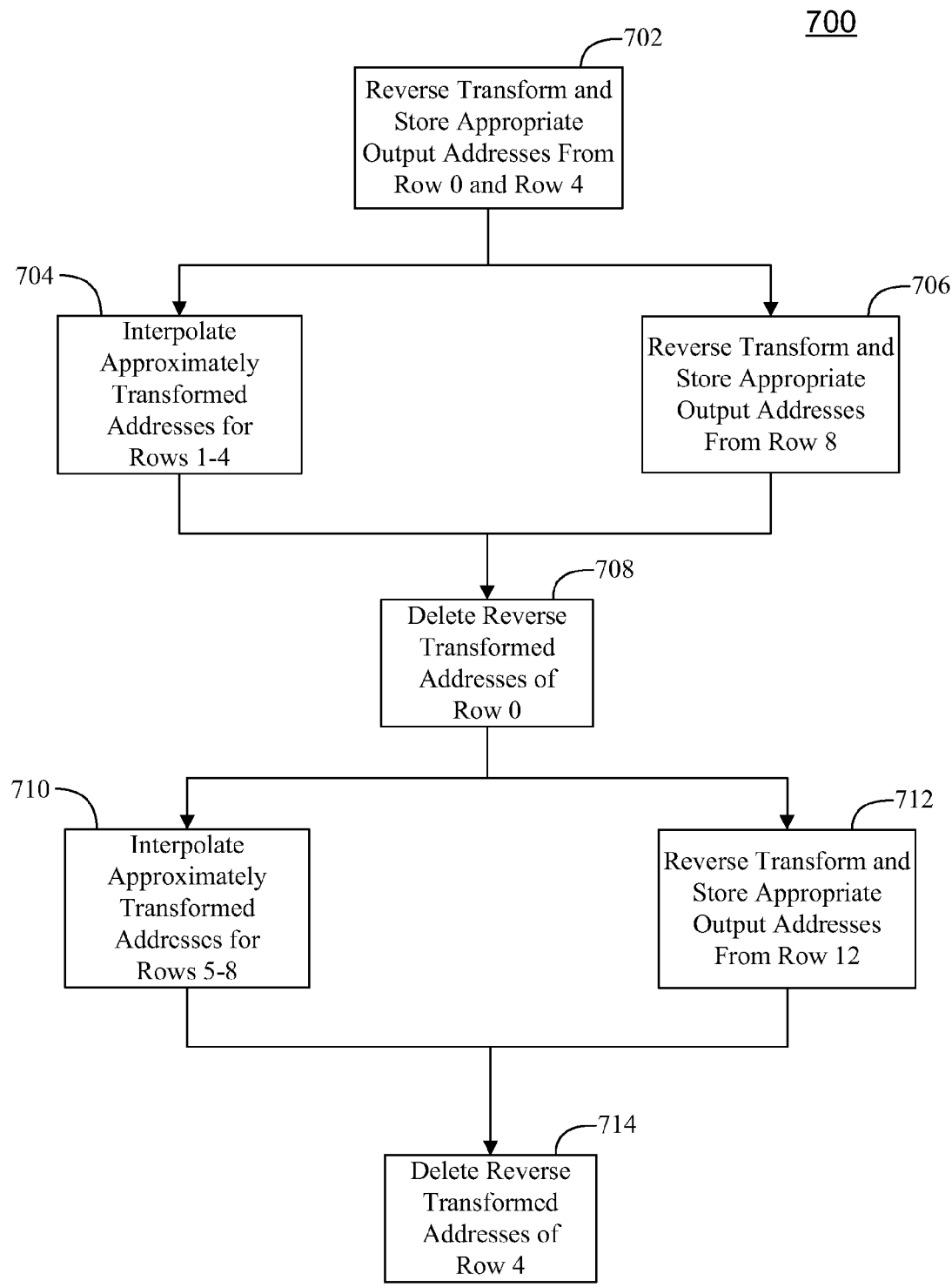
FIG. 7 shows an illustrative process for interpolating approximately transformed output pixel addresses in accordance with some embodiments of the invention.

FIG. 7 shows process 700 that can calculate approximately transformed addresses. For example, process 700 may calculate approximately transformed addresses for an output grid that includes a 4×4 grid space, such as output grid 600 of FIG. 6.

At step 702, the appropriate output addresses from Row 0 and Row 4 can be reverse transformed into accurately transformed addresses and stored in memory. For example, the addresses of pixels 601-605 of Row 0 and the addresses of pixels 606-610 of Row 4 can be reverse transformed. The accurately transformed addresses can then be stored in a memory, such as Memory 810 of FIG. 8.

After step 702, steps 704 and 706 can be performed in parallel. At step 704, approximately transformed addresses for Rows 1-4 can be calculated by interpolating the appropriate, accurately transformed addresses. For example, approximately transformed addresses for Rows 1-3 can be calculated by interpolating the pixel addresses that were reverse transformed in Row 0 and Row 4 at step 702 (e.g., the reverse transformed addresses of pixels 601-610 of FIG. 6). Similarly, approximately transformed addresses for Row 4 can be calculated by interpolating the pixel addresses that were reverse transformed in Row 4 at step 702 (e.g., the reverse transformed addresses of pixels 606-610 of FIG. 6).

As mentioned above, step 706 can be performed in parallel with step 704. At step 706, the appropriate output addresses from Row 8 can be reverse transformed into accurately transformed addresses and stored in memory. For example, the addresses of pixels 611-615 of FIG. 6 can be reverse transformed. These accurately transformed addresses can then be stored in a memory, such as Memory 810 of FIG. 8. In some embodiments, process 700 can be designed such that step 704 and step 706 require approximately the same amount of time to execute. In other words, step 704 and step 706 may begin and end at approximately the same time.

When the interpolation of the approximately transformed addresses for Rows 1-3 has completed (e.g., within step 704), the reverse transformed addresses of Row 0 may no longer be required. Accordingly, at step 708, the reverse transformed addresses of Row 0 (e.g., the reverse transformed address of pixels 601-605) can be deleted from memory. For example, these reverse transformed addresses can be deleted from a memory such as Memory 810 of FIG. 8. Although step 708 is illustrated in FIG. 7 as occurring after step 704, one skilled in the art can appreciate that step 704 could occur at any suitable time. For example, step 704 may occur any suitable time after the interpolation of the addresses of Rows 1-3 has completed.

Step 710 and step 712 can then be performed in parallel. Step 710 can execute similar to step 704, but may calculate the approximately transformed addresses for the next set of rows in process 700. For example, at step 710, approximately transformed addresses for Rows 5-7 can be calculated by interpolating the accurately transformed addresses of Row 4 and Row 8 (e.g., the reverse transformed addresses of pixels 606-615 of FIG. 6). Similarly, approximately transformed addresses for Row 8 can be calculated by interpolating the accurately transformed addresses of Row 8 (e.g., the reverse transformed addresses of pixels 611-615 of FIG. 6).

Likewise, step 712 can execute in a manner similar to step 706, but may calculate the accurately transformed addresses for the next suitable row of pixels. For example, at step 712, the addresses of the appropriate pixels of Row 12 (not pictured) can be reverse transformed. These accurately transformed addresses can then be stored in a memory, such as Memory 810 of FIG. 8.

At step 714, the reverse transformed addresses of Row 4 (e.g., the reverse transformed address of pixels 606-610) may no longer be required and can be deleted from memory. Similar to step 708, once the interpolation of the approximately transformed addresses for Rows 5-7 has completed (e.g., within step 710), the reverse transformed addresses of Row 4 may no longer be required.

Process 700 discussed above is intended to be illustrative of an embodiment and not as a limitation on types or number of differing embodiments to which the present invention is applicable. Persons skilled in the art can appreciate that steps of the processes discussed herein can be omitted, modified, combined, or rearranged, or that any combination of these steps or any additional steps can be performed without departing from the scope of the invention. For example, in some embodiments, an additional step can be included in which the approximately transformed addresses for Row 0 are interpolated. As another example, one skilled in the art can appreciate that process 700 can be extended to include any suitable amount of row numbers or column numbers. As another example, process 700 can be modified to provide calculations for any suitable grid space size (e.g., 2×2, 16×16, 32×32, or any other suitable grid space size).

Process 700 may require a memory that is large enough to hold 3 rows of accurately transformed addresses. For example, at steps 704 and 706, process 700 can be required to store accurately transformed addresses from Row 0, Row 4, and Row 8 in memory. Similarly, at steps 710 and step 712, process 700 can be required to store accurately transformed address from Row 4, Row 8, and Row 12 in memory. Accordingly, in some embodiments, process 700 can be executed in a system with enough memory to hold three rows of accurately transformed addresses. In some embodiments, however, executing process 700 in a system with a memory that can hold four or more rows of accurately transformed addresses may improve the performance of buffers or other components of that system.

Figure 8:
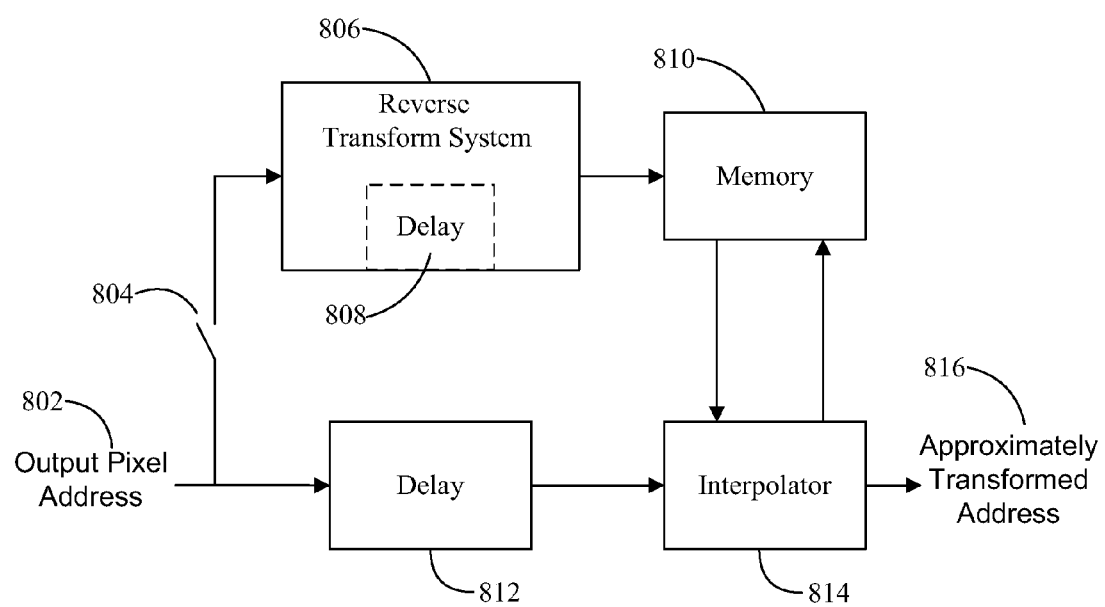
FIG. 8 shows an illustrative schematic view for an image transform system in accordance with some embodiments of the invention.

FIG. 8 shows a schematic view of efficient Image Transform System 800. For example, in some embodiments, a process such as process 700 of FIG. 7 can be executed through Image Transform System 800. Output pixel addresses can be incrementally input into system 800 through Output Pixel Address 802. For example, the address of the pixel at Row 0, Column 0 of FIG. 6 may be input into system 800, followed by the address of the pixel at Row 0, Column 1, followed by the address of the pixel at Row 0, Column 2, and so forth until all addresses of the pixels of Row 0 have been input into system 800. Similarly, after Row 0, the addresses of the pixels in Row 1 can be input into system 800, followed by the addresses of the pixels in Row 2, and so forth until all pixel addresses of the output image have been incrementally input into system 800. One skilled in the art could appreciate, however, that in some embodiments the output pixels addresses can be input into system 800 in a non-incremental order or in any other suitable order.

Switch 804 can select the appropriate output pixel addresses to be reverse transformed by coupling these addresses to Reverse Transform System 806. The output pixel addresses that are selected can be any suitable subset of output pixel addresses such as, for example, the addresses of pixels 601-615 of FIG. 6.

Reverse Transform System 806 can perform any suitable reverse transform on its received output pixel addresses to calculate accurately transformed addresses. For example, Reverse Transform System 806 can perform reverse transforms that are suitable for a dewarping image transform, a rotation image transform, a perspective adjustment image transform, a pan image transform, a tilt image transform, a zoom image transform, or any other suitable type of image transform.

As mentioned above, in some embodiments, Reverse Transform System 800 can reverse transform the output pixel addresses "slowly." For example, as illustrated by FIG. 6, one row of output pixel addresses can be reverse transformed (e.g., five output pixel addresses) in roughly the time required to interpolate the approximately transformed addresses for four rows of output pixel addresses (e.g., sixteen output pixel addresses). Accordingly, since Reverse Transform System 800 may receive the output pixel addresses required for reverse transformation within one row period of time but may need to process these reverse transformations throughout several rows periods of time (e.g., four row periods of time), Delay 808 can be included in Reverse Transform System 800. Delay 808 can store the output pixel addresses received by Reverse Transform System 800 until Reverse Transform System 800 is ready to process them. Delay 808 can include, for example, a First-In First-Out ("FIFO") delay component, or any other suitable type of delay component.

Accurately transformed addresses calculated by Reverse Transform System 806 can be stored in Memory 810. In some embodiments, Memory 810 can store accurately transformed addresses from three rows of output pixel addresses. For example, Memory 810 can be sized to store accurately transformed addresses from two rows of output pixel addresses required for interpolating approximately transformed addresses (e.g., by Interpolator 814) and from one row of output pixel addresses that are currently being reverse transformed (e.g., by Reverse Transform System 806). In some embodiments, Memory 810 can store accurately transformed addresses from four or more rows of output pixels addresses. For example, Memory 810 can store accurately transformed addresses from four or more rows of output pixel addresses to improve the performance of buffers (not pictured) or other components of Image Transform System 800. Memory 810 can include, for example, a hard-drive, a solid state drive, flash memory, permanent memory such as ROM, cache memory, semi-permanent memory such as RAM, or any other suitable data storage medium.

Output pixel addresses can be input by Output Pixel Address 802 to delay 812 and Interpolator 814. Interpolator 814 can perform bilinear interpolation, bicubic interpolation, or any other suitable type of interpolation or estimation to calculate the approximately transformed output pixel addresses. The approximately transformed output pixel address can be output through Approximately Transformed Address 816. Interpolator 814 can receive any accurately transformed addresses necessary for the interpolation calculations from Memory 810.

Since Interpolator 814 may not be able to perform the interpolation calculations until the appropriate, accurately transformed addresses have been stored in Memory 810, delay 812 can be included in Image Transform System 800. For example, as illustrated by FIG. 6, the accurately transformed addresses from Row 0 and Row 4 can be calculated before interpolating the output pixel addresses of Row 1. The reverse transforms for Row 4 may not finish processing until the output pixel addresses for Row 8 are received by the system (e.g., received by Image Transform System 800). Accordingly, in this scenario, delay 812 can delay the output pixel addresses by approximately seven row periods of time. Depending on the size of the grid space or any other suitable attribute of Image Transform System 800, however, one skilled in the art could appreciate that delay 812 can delay the output pixel addresses for any suitable period of time. Since the value of the output pixel addresses may routinely increment, in some embodiments, delay 812 can include an arithmetic offset component. In some embodiments, delay 812 can include a FIFO delay component or any other suitable type of delay component.

In some embodiments, Reverse Transform System 806 can be performed by a dedicated circuit. For example, Reverse Transform System 806 can include a microchip that has been fabricated to perform the reverse transform calculations necessary for a particular image transform. Furthermore, as mentioned above, in some embodiments the reverse transform calculations can be performed "slowly" such that multiple row periods of time are used in order to reverse transform the appropriate pixel addresses from one row of pixels. As used herein, this type of system can be termed a "Dedicated Slow Calculation System." A Dedicated Slow Calculation System can have relatively low power and microchip area requirements, while still being capable of processing complicated image transformations and interpolation calculations.

In some embodiments, Reverse Transform System 806 can include a dedicated circuit that can perform reverse transforms "quickly." As used herein, this type of system can be termed a "Dedicated Quick Calculation System." A Dedicated Quick Calculation System can, for example, reverse transform the appropriate pixel address from one row of pixels in approximately one row period of time. The system performing the reverse transforms (e.g., Reverse Transform System 806 of FIG. 8) may then be idle until the next row of pixel addresses requiring reverse transformations is received. Accordingly, a Dedicated Quick Calculation System may reduce the amount of power used by an image transform system. Furthermore, by performing the reverse transforms in one row period of time, a Dedicated Quick Calculation System can operate with a memory (e.g., Memory 810 of FIG. 8) that may store a minimum of 2 rows of accurately transformed addresses. However, performing the reverse transforms more quickly may require a dedicated circuit with a larger chip area and may require reverse transform calculations that are more complex than slower systems such as, for example, a Dedicated Slow Calculation System.

In some embodiments, Reverse Transform System 806 can be performed by a non-dedicated circuit. For example, Reverse Transform System 806 can include a microprocessor that is coupled to Image Transform System 800. In addition to performing calculations for Image Transform System 800, this non-dedicated circuit (e.g., microprocessor) may perform calculations for other systems or processes coupled to the non-dedicated circuit. For example, the non-dedicated circuit can be included in a computer system and may additionally operate system applications for the computer system, operate firmware applications for the computer system, perform hardware authorization applications, or perform any other suitable calculations that are not related to Image Transform System 800. The non-dedicated circuit may then be used to perform reverse transforms for Image Transform System 800 as these calculations are required.

In some embodiments, the non-dedicated circuit can perform the reverse transforms "quickly." As used herein, this type of system can be termed a "Non-Dedicated Quick Calculation System." For example, the non-dedicated circuit can reverse transform the appropriate pixel address from one row of pixels in approximately one row period of time. Accordingly, a Non-Dedicated Quick Calculation System can operate with memory (e.g., Memory 810) that is sized to store a minimum of 2 rows of accurately transformed addresses. The non-dedicated circuitry may then be free to perform other tasks (e.g., for a computer system coupled to the non-dedicated circuitry) when reverse transforms are not required for Image Transform System 800. For example, the non-dedicated circuit may include an interrupt routine that is slaved to the timing of the reverse transforms, such that the non-dedicated circuit is instructed to perform the reverse transforms as they are required by Image Transform System 800.

In some embodiments, the non-dedicated circuit can perform the reverse transforms "slowly." As used herein, this type of system can be termed a "Non-Dedicated Slow Calculation System." For example, the Non-Dedicated Slow Calculation System may utilize multiple row periods of time to reverse transform the appropriate pixel addresses from a single row of pixels. As mentioned above, a slow reverse transform system may store a minimum of three rows of accurately transformed addresses. In a Non-Dedicated Slow Calculation System, in some embodiments the third row of accurately transformed addresses can be stored in a memory that is private to the non-dedicated circuitry (e.g., a microprocessor's conventional data RAM, or any other suitable, private memory). The third row of accurately transformed addresses can be written to the image transform system's memory (e.g., Memory 810 of FIG. 8) when required. Accordingly, in this scenario, the image transforms system's memory may only need to be large enough to hold two rows of accurately transformed addresses.

Figure 9:
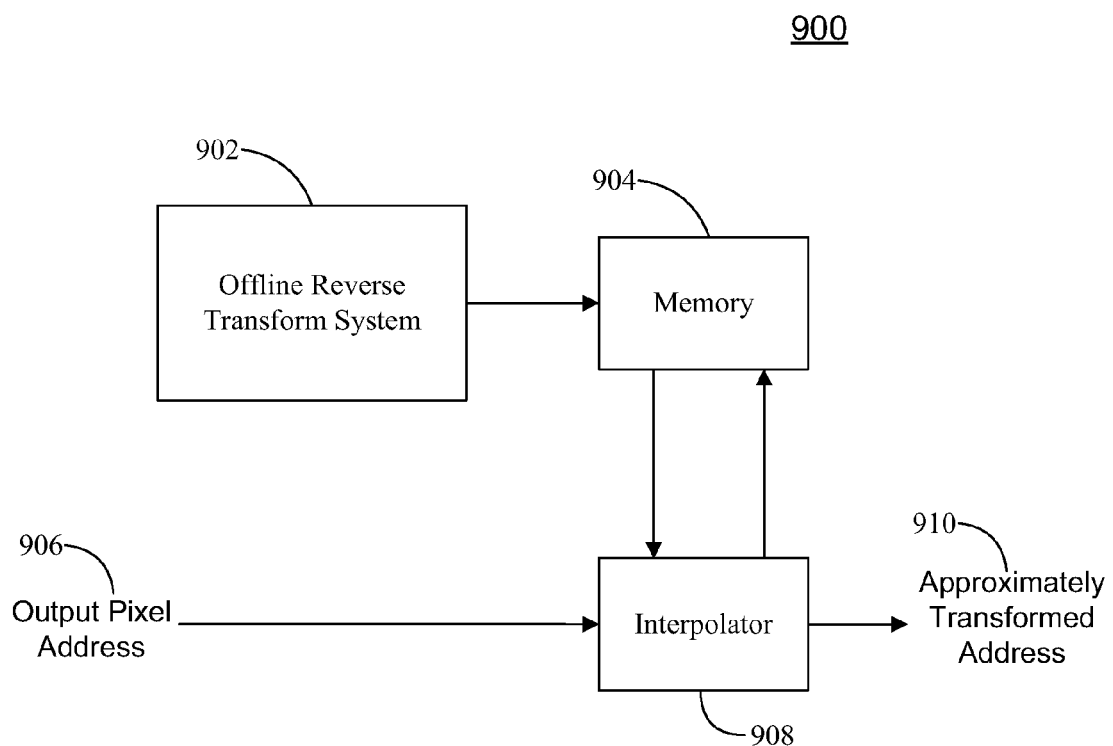
FIG. 9 shows an illustrative schematic view for an image transform system in accordance with some embodiments of the invention.

In some embodiments, the reverse transforms can be performed by an "Offline Calculation System." For example, FIG. 9 shows image transform system 900 that can calculate reverse transforms through an Offline Calculation System, such as Offline Reverse Transform System 902. Offline Reverse Transform System 902 can include, for example, non-dedicated circuitry, dedicated circuitry, a software application running on a microprocessor, or any combination of the above.

Offline Reverse Transform System 902 can calculate the accurately transformed addresses separately or "offline" from the interpolation process. For example, Offline Reverse Transform System 902 may calculate all accurately transformed addresses necessary to perform an image transform and store these values in a memory, such as Memory 904. Since the reverse transforms are performed offline and are not tied to the interpolation process, these reverse transform calculations can be performed in any suitable amount of time. Additionally, if the offline calculations are performed by a software application (e.g., run by non-dedicated circuitry), image transform system 900 can gain flexibility in the types of reverse transforms and image transforms that may be performed by image transform system 900.

Memory 904 can be sized large enough to store all of the accurately transformed addresses for the entire image. Accordingly, since all accurately transformed addresses may already be stored in memory and available for the interpolation calculations, image transform system 900 may not require delay components to delay the output pixel addresses. Memory 904 can include any suitable data storage medium such as, for example, a hard-drive, solid state drive, flash memory, permanent memory such as ROM, cache memory, semi-permanent memory such as RAM, or any other suitable type of storage component, or any combination of the above.

The output pixel addresses can be input through Output Pixel Address 906 to interpolator 908. Interpolator 908 can perform bilinear interpolation, bicubic interpolation, or any other suitable type of interpolation or estimation to calculate the approximately transformed output pixel addresses. The approximately transformed output pixel address can be output through approximately transformed address 910. As necessary, interpolator 908 can receive the accurately transformed addresses required for the interpolation calculations from Memory 904.

The processes discussed above are intended to be illustrative and not as a limitation on types or number of differing embodiments to which the present invention is applicable. Persons skilled in the art can appreciate that steps of the processes discussed herein can be omitted, modified, combined, or rearranged, or that any combination of these steps or any additional steps can be performed without departing from the scope of the invention.

It will be apparent to those of ordinary skill in the art that methods involved in the invention may be embodied in a computer program product that includes a machine readable and/or usable medium. For example, such a computer usable medium may consist of a read only memory device, such as a CD ROM disk or conventional ROM device, or a random access memory, such as a hard drive device or a computer diskette, or flash memory device having a computer readable program code stored thereon.

The above described embodiments of the invention are presented for purposes of illustration and not of limitation.

What is claimed is:
1. A system comprising:
a reverse transform component operable to calculate a plurality of transformed addresses by executing a reverse transform on a subset of output pixel addresses of an output image;

a storage device operable to store the plurality of transformed addresses; and an interpolation component operable to calculate an approximately transformed address of a particular output pixel address of the output image by interpolating at least one of the stored transformed addresses.

2. The system of claim 1, wherein the interpolation component is further operable to:

receive the particular output pixel address to be approximately transformed; and receive from the storage device the at least one stored transformed address to be interpolated.

3. The system of claim 1, wherein the approximately transformed address is communicated as a read address to a memory device storing an input image.

4. The system of claim 1, wherein the interpolation component is further operable to calculate a particular approximately transformed address for every output pixel address of the output image.

5. The system of claim 1, wherein the storage device is further operable to store accurately transformed addresses from three rows of pixels of the output image.

6. The system of claim 5, wherein the three rows comprise:

a first row comprising an output pixel address on which the reverse transform component is currently executing a reverse transform; and a second row comprising the at least one accurately transformed address received by the interpolation component.

7. The system of claim 1, further comprising:

a delay component operable to delay the interpolation component's receipt of the particular output pixel address until the interpolation component is operable to calculate the approximately transformed address.

8. The system of claim 1, wherein the reverse transform component is further operable to execute the reverse transform on output pixel addresses of the subset from one row of pixels of the output image in multiple row periods of time.

9. The system of claim 1, wherein the reverse transform component is further operable to execute the reverse transform on output pixel addresses of the subset from one row of pixels of the output image in one row period of time.

10. The system of claim 1, wherein the reverse transform component comprises:

dedicated circuitry operable to perform the reverse transform.

11. The system of claim 1, wherein the reverse transform component comprises:

non-dedicated circuitry operable to execute a software program performing the reverse transform.

12. The system of claim 1, wherein the reverse transform component comprises:

an offline calculation system.

13. A method for performing an image transform comprising:

determining a subset of output pixel addresses from a plurality of output pixel addresses of an output image;

calculating a reverse transformed address ("transformed address") of at least one output pixel address of the subset by performing a reverse transform, wherein the reverse transform is associated with a particular image transform; and approximating a reverse transformed address ("approximated address") of at least one of the plurality of output pixel address by interpolating the transformed address.

14. The method of claim 13, further comprising:

determining input pixel data of an input image that is associated with the approximated address; and associating the determined input pixel data with the output pixel address from which the approximated address was approximated.

15. The method of claim 14, wherein determining input pixel data comprises:

reading input pixel data of the input image from at least two input pixel addresses neighboring the approximated address; and interpolating the read input pixel data.

16. The method of claim 13, wherein determining a subset of output pixel addresses comprises:

defining an output pixel grid comprising a plurality of grid spaces, wherein the vertices of the grid spaces are each located at one of the plurality of output pixel addresses of the output image; and defining the subset as the output pixel addresses located at the vertices of each grid space.

17. The method of claim 16, wherein the grid spaces comprise a particular size, and wherein the particular size is selected to produce a pre-determined ratio of the quality of the image transform to the complexity of the image transform.

18. The method of claim 13, wherein:

the calculating comprises:

calculating reverse transformed addresses of output pixel addresses of the subset located on a first row and on a second row of pixels of the output image; and the approximating comprises:

approximating the reverse transformed addresses of output pixel addresses located between the first row and the second row; and approximating the reverse transformed addresses of output pixel addresses located on the second row.

19. The method of claim 18, wherein the calculating further comprises:

calculating reverse transformed addresses of output pixel addresses of the subset located on a third row of pixels of the output image in parallel with the approximating.

20. The method of claim 19, wherein the reverse transformed addresses calculated for the output pixel addresses of the subset located on the first row are deleted from a memory after approximating the reverse transformed addresses of output pixel addresses located between the first row and the second row.

21. A method of performing an image transform comprising:

determining a subset of output pixel addresses from a plurality of output pixel addresses of an output image;

performing a reverse transform on each output pixel address of the subset to calculate a transformed address of each output pixel address of the subset, wherein the reverse transform is associated with a particular image transform; and for each one of the output pixel addresses, calculating an approximately transformed address for each one of the output pixel addresses by interpolating an accurately transformed address.

* * * * *